United States Patent
McGinnis et al.

(10) Patent No.: US 11,775,599 B2
(45) Date of Patent: Oct. 3, 2023

(54) SYSTEM AND METHOD FOR DISPLAYING CUSTOMIZED SEARCH RESULTS BASED ON PAST BEHAVIOUR

(71) Applicant: SHOPIFY INC., Ottawa (CA)

(72) Inventors: Jesse McGinnis, Waterloo (CA); Jovana Mandic, Toronto (CA); Moya Miller, Guelph (CA); Jeffrey Kraemer, Kitchener (CA)

(73) Assignee: SHOPIFY INC., Ottawa (CA)

( * ) Notice: Subject to any disclaimer, the term of this patent is extended or adjusted under 35 U.S.C. 154(b) by 291 days.

(21) Appl. No.: 17/094,080

(22) Filed: Nov. 10, 2020

(65) Prior Publication Data

US 2022/0148060 A1     May 12, 2022

(51) Int. Cl.
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC .......... G06F 16/9535; G06F 16/9536; G06F 16/9538
See application file for complete search history.

(56) References Cited

U.S. PATENT DOCUMENTS

| 8,060,396 | B1* | 11/2011 | Bessler | G06Q 10/0633 |
| | | | | 705/7.22 |
| 9,720,974 | B1* | 8/2017 | Sarmento | G06F 16/24573 |
| 9,996,626 | B1* | 6/2018 | Bailey | G06F 16/9535 |
| 10,055,784 | B1* | 8/2018 | Boelter | G06F 16/9535 |
| 10,068,284 | B1* | 9/2018 | Zisk | G06F 3/04842 |
| 2007/0233671 | A1* | 10/2007 | Oztekin | G06F 16/9535 |
| | | | | 707/999.005 |
| 2014/0379694 | A1* | 12/2014 | Denise | G06F 16/951 |
| | | | | 707/722 |
| 2015/0154251 | A1* | 6/2015 | Cockcroft | G06F 16/951 |
| | | | | 707/722 |

* cited by examiner

*Primary Examiner* — Grace Park

(57) ABSTRACT

Systems and methods of presenting search results, in response to a general search query, are provided in a manner intended to improve the efficiency of a user that uses general search queries A given user may be interested in results of a specific type, and may consistently interact with the system in a similar manner following conducting a given search. The system tracks requests from a user following a presentation of search results in response to a general search query. This is stored as tracking information. The tracking information is processed to identify patterns in user behaviour, and search results for further search queries are then presented in a manner that takes into account the tracking information. In a specific embodiment, this is applied in an e-commerce context. The tracking information may be stored in association with commerce object types such as products, orders, returns, customers.

19 Claims, 18 Drawing Sheets

FIG. 8

SYSTEM AND METHOD FOR DISPLAYING CUSTOMIZED SEARCH RESULTS BASED ON PAST BEHAVIOUR

FIELD

The application relates to systems and methods for displaying search results, and, in particular, systems and methods for displaying customized search results in response to a search entered in an E-commerce system.

BACKGROUND

In many systems, such as E-commerce systems, users (for example merchants and their staff) often use a general search capability to find information they are looking for. A general search capability may search all of the information that is available to the user conducting the search. This may include all data pertaining to one or more stores associated with the user.

Examples of searches that might be performed include:
searches to resolve a customer issue;
searches to update product details, to pack an order;
searches to determine fraud risk, etc.

Search results returned may include objects of different types. In the E-commerce context, these may include, for example, products, orders, returns, customers, and other commerce objects, each of which has a variety of associated fields, such as a SKU (stock-keeping unit) for a product, an order status for an order (e.g. open, fulfilled, shipped, delivered), name and product purchase history for a customer, etc.

Systems may also be implemented with specifically configured object specific searches. An object specific search is limited to a specific type of object. For example, a specifically configured search for an order could be provided that is specifically limited to orders. It may be possible to conduct a search for an order number using an order specific search, and the search result will be the single record for the specified order. In contrast to an object specific search, typically a general search does not return search results limited to objects of a specific type, but rather will conduct the search over all object types, and will return more than one type of search result for a given query, each of which is more or less relevant to what the user is actually searching for. For example, if a user enters an order identifier as a general search query, an order object as well as the customer object for the customer who placed the order may show up in the list of search results. Typically, each search result displayed is a short summary of some available information for the item, designed to allow for multiple results to fit into a small area for browsing. A search result can be clicked on or otherwise selected to bring the user to a new screen displaying the full details of the item (e.g. clicking on a product commerce object may bring the user to a full product page). Often the search result is simply a truncation of the full linked page, i.e. the first few words or sentences or fields of the linked page.

Conventional search results in response to general search queries are not presented in a manner that is necessarily the most useful to the user conducting the search.

SUMMARY

Systems and methods of presenting search results, in response to a general search query, are provided in a manner intended to improve the efficiency of a user that uses general search queries. Notwithstanding the fact that a general search query is being used, a given user may be interested in results of a specific type, and may consistently interact with the system in a similar manner following conducting a given search. The system tracks requests from a user following a presentation of search results in response to a general search query. This is stored as tracking information. The tracking information is processed to identify patterns in user behaviour, and search results for further search queries are then presented in a manner that takes into account the tracking information. In a specific embodiment, this is applied in an e-commerce context. The tracking information may be stored in association with commerce object types such as products, orders, returns, customers.

BRIEF DESCRIPTION OF THE DRAWINGS

Embodiments of the disclosure will now be described with reference to the attached drawings in which:

FIG. 8 is an example of a home page of a merchant, according to one embodiment.

DETAILED DESCRIPTION

The operation of the current example embodiments and the structure thereof are discussed in detail below. It should be appreciated, however, that the present disclosure provides many applicable inventive concepts that can be embodied in any of a wide variety of specific contexts. The specific embodiments discussed are merely illustrative of specific structures of the disclosure and ways to operate the disclosure, and do not limit the scope of the present disclosure.

Quick access to the relevant fields of an object, such as an e-commerce object, appearing in a search result can save time for a user. In a specific example, a customer service staff member may have a live customer on the line (e.g. phone, chat) waiting for an answer to their question, and the ability to speed up the answer is important both from a customer service standpoint, but also from an efficiency standpoint. Other use cases for quick access include improving fulfillment efficiency (picking and packing orders as quickly as possible in a warehouse for example), and general time-saving for busy entrepreneurs (e.g. the CEO having to answer questions).

Figure 1:
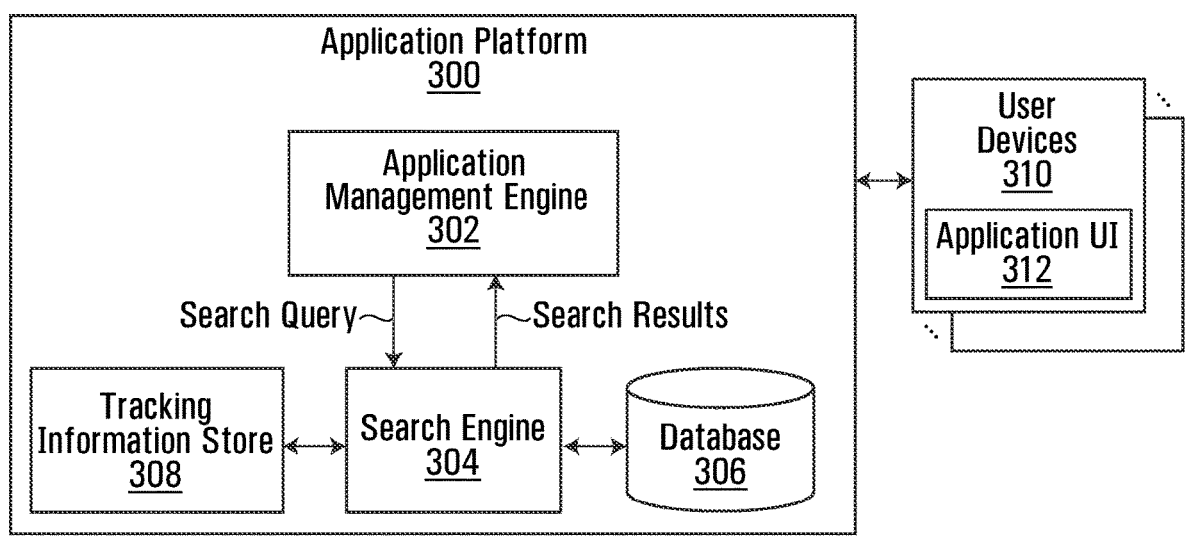
FIG. 1 is a block diagram of an application platform with customized search capability that takes into account tracking information pertaining to previous user behaviour.

A block diagram of an application platform with customized search capability is depicted in FIG. 1. The application platform, generally indicated at 300, may be an e-commerce platform, or a platform for another type of application. The application platform 300 has an application management engine 302, which performs the main application management functions for the application executed on the application platform 300. The application management engine 302 might be a commerce engine for the e-commerce platform example.

Shown is a search engine 304 and a database 306 containing data upon which searches performed by the search engine are executed. More generally, there may be one or multiple databases, and they may be local or remote to the application platform 300. The set(s) of data that are searchable may vary by user. For example, in the e-commerce example, while the database(s) may contain data for multiple merchants, when a user associated with a given merchant conducts a search, their search is limited to data of that merchant.

Also shown is a tracking information store 308 used to store tracking information pertaining to requests received from user devices responsive to search results, as described in further detail below.

User devices are indicated at 310. In practice there may be multiple user devices, and the user devices may have one or multiple types. For example, in the e-commerce example, the user devices may include customer devices and merchant devices. The user devices 310 may include devices connected directly to the application platform 300, and/or devices connected via one or more intervening networks, such as a LAN, WAN or the internet to name a few specific examples.

The user devices 310 interact with the application platform via an application user interface that may be provided by the application platform or by a client application running on the user devices. In the illustrated example, one of the user devices 310 is depicted with an application UI 312 of a client application running on the user device 310.

In operation, during what can be viewed as a training phase, general search queries are received from user devices 310 by the application management engine 302. Each general search query is processed by the search engine 304, which conducts a search on database 306, and provides search results which are forwarded by the application management engine 302 back to the user device that issued the search query, where they are presented for viewing by a user.

After the search results are presented, a request responsive to the set of search results may be received from the user device that initiated the search query, for example via application UI 312. The request may be, for example, a selection of a specific result from the set of search results. Alternatively, the request may be a further action on an object of a particular type (e.g. viewing an order status; scrolling down to view inventory count). Alternatively, the request may be a further change to a data field accessed following selection of a specific search result from the set of search results; this may, for example, involve viewing and then completing or editing a data field following selection of a search result (e.g. modifying a risk level on an order). The type of requests possible will be a function of a given system implementation.

In the above examples, the request responsive to the set of search results relates to performing an action within the results, for example, initiating fulfillment of an order, or fulfilling an order by clicking a button in the results section. In another embodiment, rather than waiting for search results to enter a request relating to performing an action, the user can take an action by entering specific keywords into the search bar itself. For example, a user could enter in the search bar itself: "Order 12231 update status: fulfilled" and hitting enter on that would change the status of that order to "fulfilled" without ever leaving the search bar.

In effect, another request/action that might be tracked might not be received responsive to a set of search results but rather may be a side-effect of the search query itself.

The application management engine 302 responds to/addresses the request. In addition, tracking information is maintained in the tracking information store 308 indicating what request was received for each general search query.

In some embodiments, the tracking information is grouped by object type, to increase the relevance of the tracking information to each object type. Stated another way, a given piece of tracking information may be included in a group of tracking information for a particular object type. For example, in the e-commerce context, the tracking information may be grouped into respective groups of tracking information for commerce object types, including products, orders, returns, customers. For example, interacting with the price field of a product object likely has little relevance to the price field on an order object, so tracking information pertaining to a request dealing with the price field of a product object can be included in a group of tracking information pertaining to product objects, as opposed to a group of tracking information pertaining to order objects.

The tracking information store 308 may be used to store information tracking previous actions taken by the user, either associated with a similar query they made in the past, or associated with interacting with similar commerce objects in the past. For example, a user may always open a list of line items of an order because they are a warehouse picker.

In some embodiments, the tracking information 308 is organized by user and customized search results, discussed in detail below, are generated based only on the tracking information stored for the same user conducting a search. Additionally or alternatively, the tracking information for multiple users may be used to generate customized search results. For example, this is done for a set of users that satisfies some constraint.

In a first example, tracking information for multiple users is considered if the multiple users share a similar overall collection of tasks/actions (e.g. perhaps have a similar organizational "role" and/or have a similar search history). For example, tracking information may be combined for a set of users who tend to look at the pick list of orders (warehouse pickers), or who tend to look at the fraud risk level field of orders (fraud analysts).

In a second example, tracking information for multiple users may be combined pertaining to actions taken for a particular type of commerce object across all users who have interacted with this type of commerce object before (e.g. most popular fields per commerce object).

After the initial training phase, the tracking information is then taken into account by the search engine when generating a further set of search results in response to a further search query.

There are numerous ways that the tracking information can be processed and taken into account in this manner. A specific example will be described. In this example, for all searches having a given search syntax, all requests in response the searches are grouped by request type. For example, using the request type examples introduced above, the requests can be grouped as follows:

Group of requests each of which is a selection of a specific result from the set of search results;

Group of requests each of which is a specific further action on an object of a particular type (e.g. viewing an order status; scrolling down to view inventory count).

Group of requests each of which is a further change to a specific data field accessed following selection of a specific search result from the set of search results.

Based on this stored information, probabilities can be determined for each request type, this being the probability that a request of that type will be received following a search having the given search syntax.

When a further search having the given search syntax is received, search results are based on these probabilities, a further set of search results is generated based on these probabilities. In a specific example, if a single request type has a probability higher than a threshold, then search results are presented that assume the user would have responded with a request having that single request type.

In some embodiments, following or during the initial training phase, the tracking information is processed offline (meaning not tied to any specific new search query) to identify patterns in user behaviour following search queries, and such patterns can be updated over time. This processing is used to identify what to display to a user in response to a search query that will reflect the prior behaviour. In some embodiments, customized previews are generated for use in responding to future search queries.

In other embodiments, after the initial training phase, the tracking information is processed after receipt of a search query to determine what to display to a user in response to that search query. For example, the tracking information may be processed to identify patterns in user behaviour in response to previous search queries similar to the current search query. In this case, in some embodiments, this can involve generating a customized preview for use in responding to the specific search query.

The tracking information store 308 is still updated following the initial training phase. The initial training phase may last for a fixed period of time, or for as long as necessary to accumulate a sufficient amount of tracking information in the tracking information store 308 to be considered a reliable indicator of user behaviour. The training phase may have a different duration for different types of search query, as sufficient tracking information may be received in a shorter period of time for some types of search queries that are performed more often than other types of search queries. In one example, the length of the training phase is based on when predictions made by a model are expected to be correct with a defined accuracy rate. In another example, the length of the training phase is based on when a sufficiently large (e.g. a defined size) set of tracking information is generated through query collection such that a decision can be made.

In some embodiments, for at least one search result included in the further set of search results that relates to an object of a particular type, a preview customized for that object type based on the tracking information is presented.

Presenting a preview customized based on the tracking information may involve, for example presenting one or more data fields from the object for viewing. For example, relevant fields of an object to display in the search result area, may be determined based on a combination of the search query itself, the previous actions of the user, the type of object(s) identified, and the previous actions of other users.

In some embodiments, presenting a preview customized based on the tracking information may involve, presenting a shortcut to a task. For a given search result, one or more shortcuts may be included in the search result that link to actions that can be achieved by clicking through the search result.

In some embodiments, presenting a preview customized based on the tracking information may involve presenting one or more fields of an object, for example a commerce object, for completion or editing by the user directly from within the search result.

The search query may also be used to determine the relevant objects to display. In some cases, the search query may be analyzed for indications of the fields of interest to the user. For example, a user querying "order 1002 delivered" is likely interested in the order status of order 1002. Thus, in deciding what to display in response to the "order 1002 delivered" query, tracking information pertaining to previous searches concerning order commerce objects may be considered.

The number of search results displayed can also be tailored to make more or less room for displaying fields that are determined to be particularly relevant to the search query.

When considering the tracking information, the system may emphasize tracking information pertaining to more recent requests more strongly than requests received in the distant past.

The following is a very specific example flow specific to the e-commerce example.

1. A customer service representative is on the phone with a buyer who is asking about the status of their order 1002.
2. To quickly answer the question, the representative types "order 1002 status" into the search bar.
3. Based on the word "order" being heavily associated with order commerce objects (due to previous users searching for "order" in their queries and interacting frequently with order objects over other objects), "status" matching the field "status" on the order object, and "1002" matching its order ID, the Order commerce object for order 1002 is shown as the first search result, and its status field is shown first in the subset of fields shown for the order.
4. The representative types similar queries for the rest of the morning (e.g. "order 1100 status", "order 1013 status"), as 90% of buyer calls are inquiries about order status.
5. The representative then types a shorter query "order 1009".
6. Based on the previous actions of the user interacting with the status field of an order object, the first search result displayed is an order object with the status field first in its summary.

Figure 2:
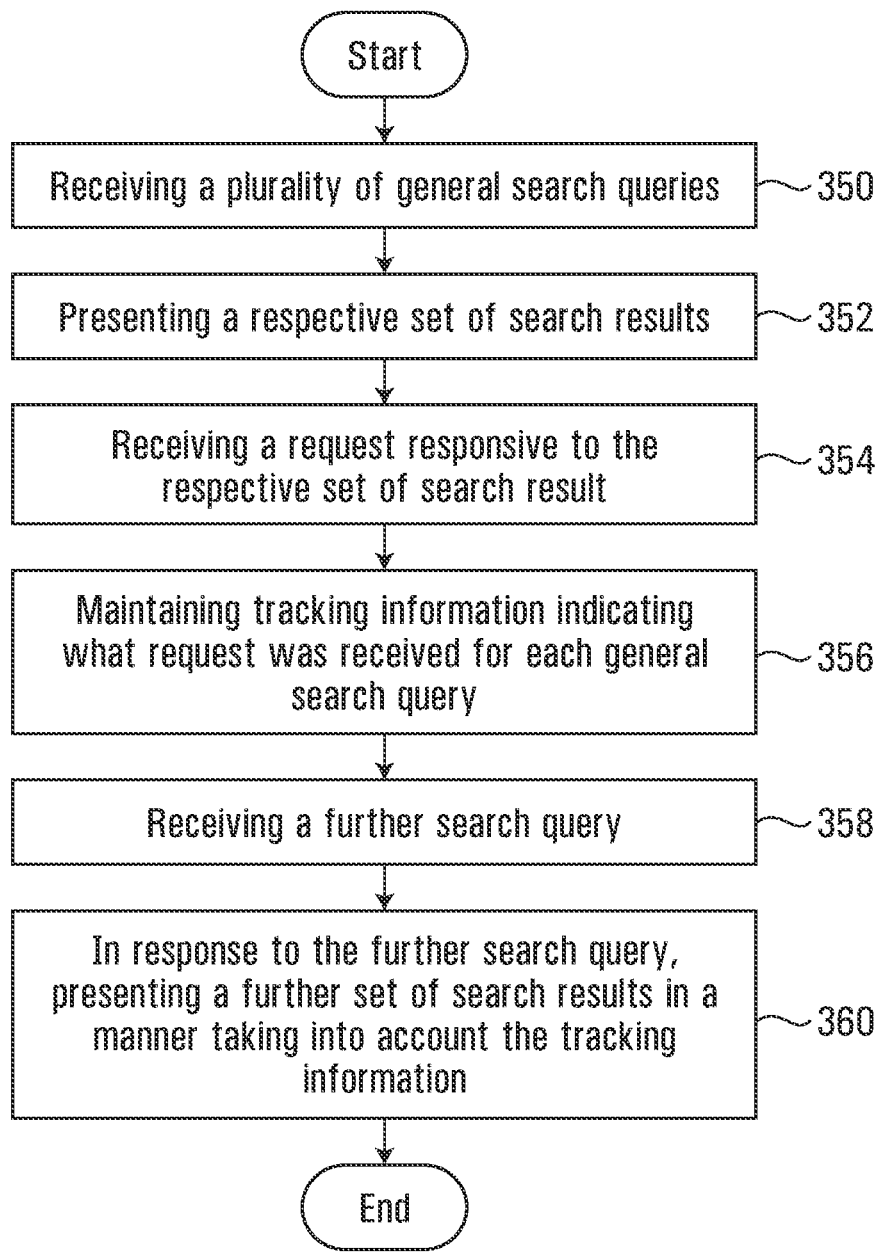
FIG. 2 is a flowchart of a method of providing customized search results that takes into account tracking information pertaining to previous user behaviour.

Referring now to FIG. 2, shown is a flowchart of a method of presenting search results based on past behaviour. The method begins at block 350 with receiving a plurality of general search queries. Blocks 352, 354 and 356 are executed for each general search query. Block 352 involves in response to each general search query presenting a respective set of search results. Block 354 involves receiving a request responsive to the respective set of search result. The request is one of a combination of two or more of:

a) selection of a specific result from the respective set of search results, b) a further action on an object of a particular type, or c) a further change to a data field accessed following selection of a specific search result from the respective set of search results.

Block 356 involves maintaining tracking information indicating what request was received for each general search query. The method continues in block 358 which involves receiving a further search query. Block 360 involves, in response to the further search query, presenting a further set of search results, wherein the further set of search results is presented in a manner taking into account the tracking information.

Figure 3A:
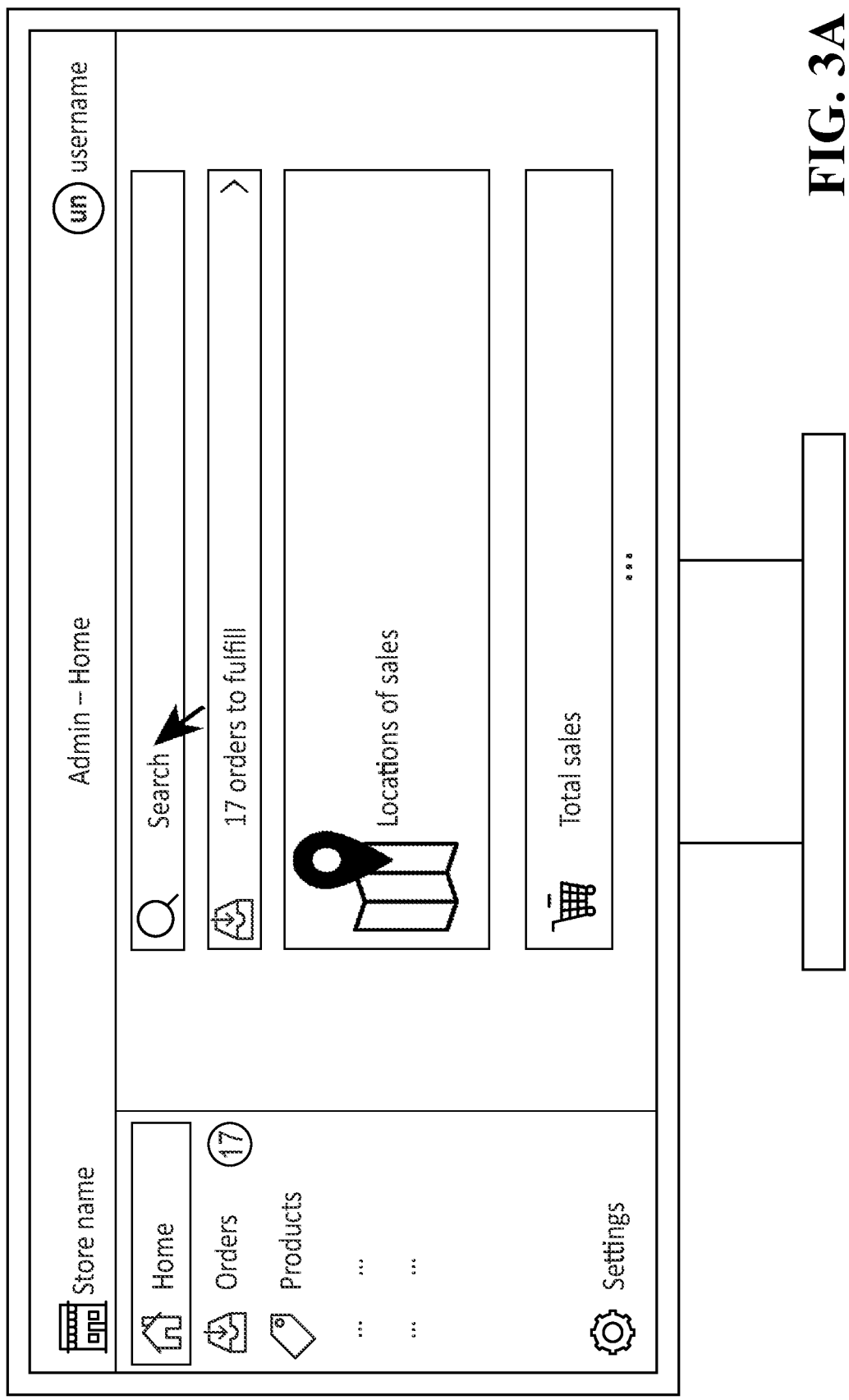
FIGS. 3A-3I are examples of graphical user interfaces for a first set of examples of presenting customized search results.

A first set of examples will be described with reference to FIGS. 3A to 3I. FIG. 3A is an example of a landing page for an application user interface.

Figure 3B:
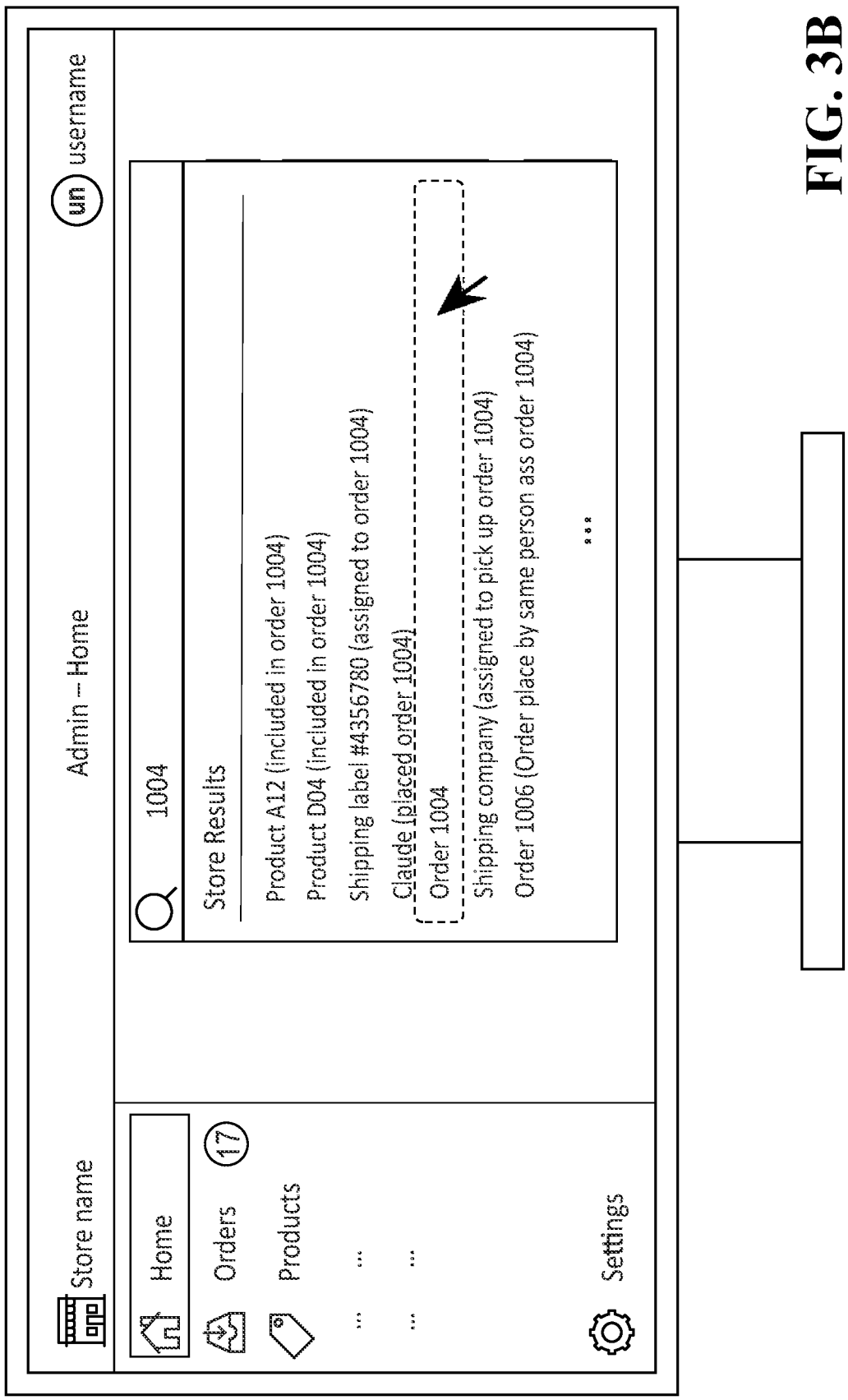
Figure 3C:
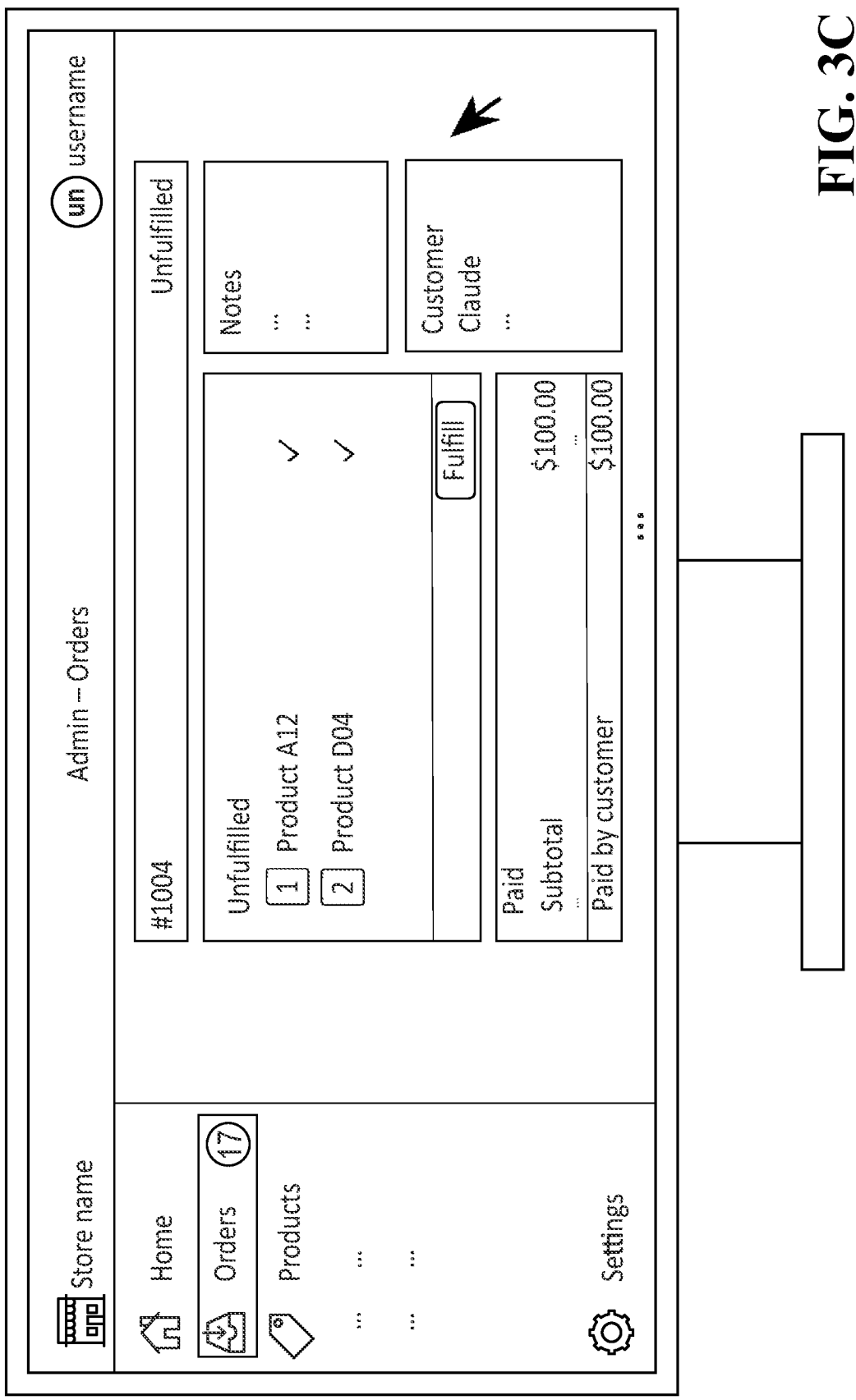

FIG. 3B shows an example of a search for 1004 in a general search query window. Various results are displayed including "order 1004" as the 5$^{th}$ hit. The user selects the result for "order 1004". FIG. 3C shows an example of a page for commerce object "order 1004" that is displayed following the user selection of the result for "order 1004" from the results presented as depicted in FIG. 3B. In the example of FIGS. 3B and 3C, no context/user specific display of search results is performed.

FIGS. 3D to 3I are examples where search results are presented having taken into account the tracking information. Different stored tracking information is used as a basis for presenting the search results for each of the examples, although this is not shown in the examples. Assumptions for the stored tracking information are set out in each example. Different tracking information will result in different outcomes.

Figure 3D:
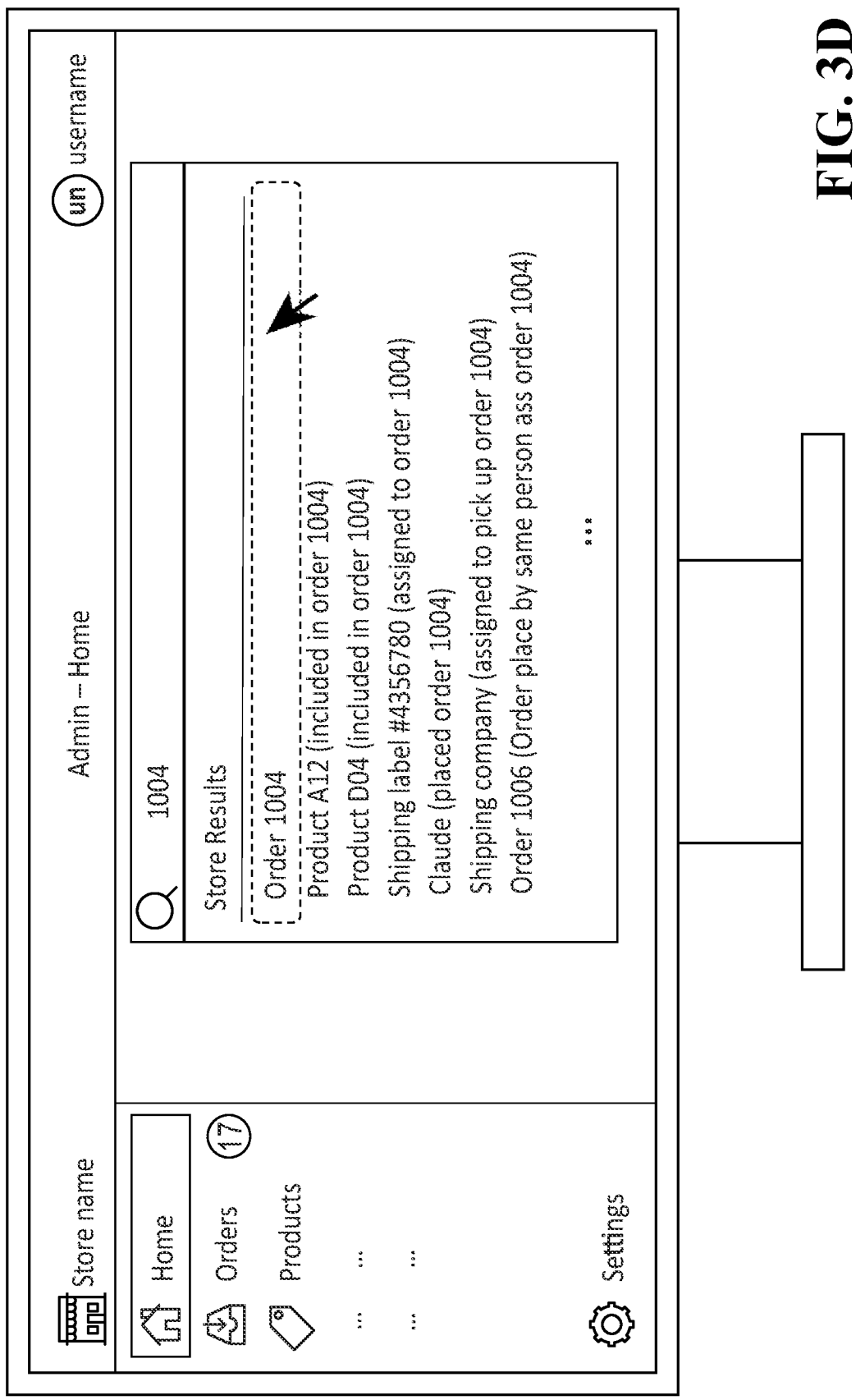

In FIG. 3D, the user has searched for 1004 in the general search query, various results are displayed; based on previous behaviour maintained in the tracking information, "order 1004" is the first hit. The example of FIG. 3D presupposes that tracking information has been stored from which it can be deduced that a user entering a search query having a format "<##>" is interested in a commerce order object having order ID <##>.

Figure 3E:
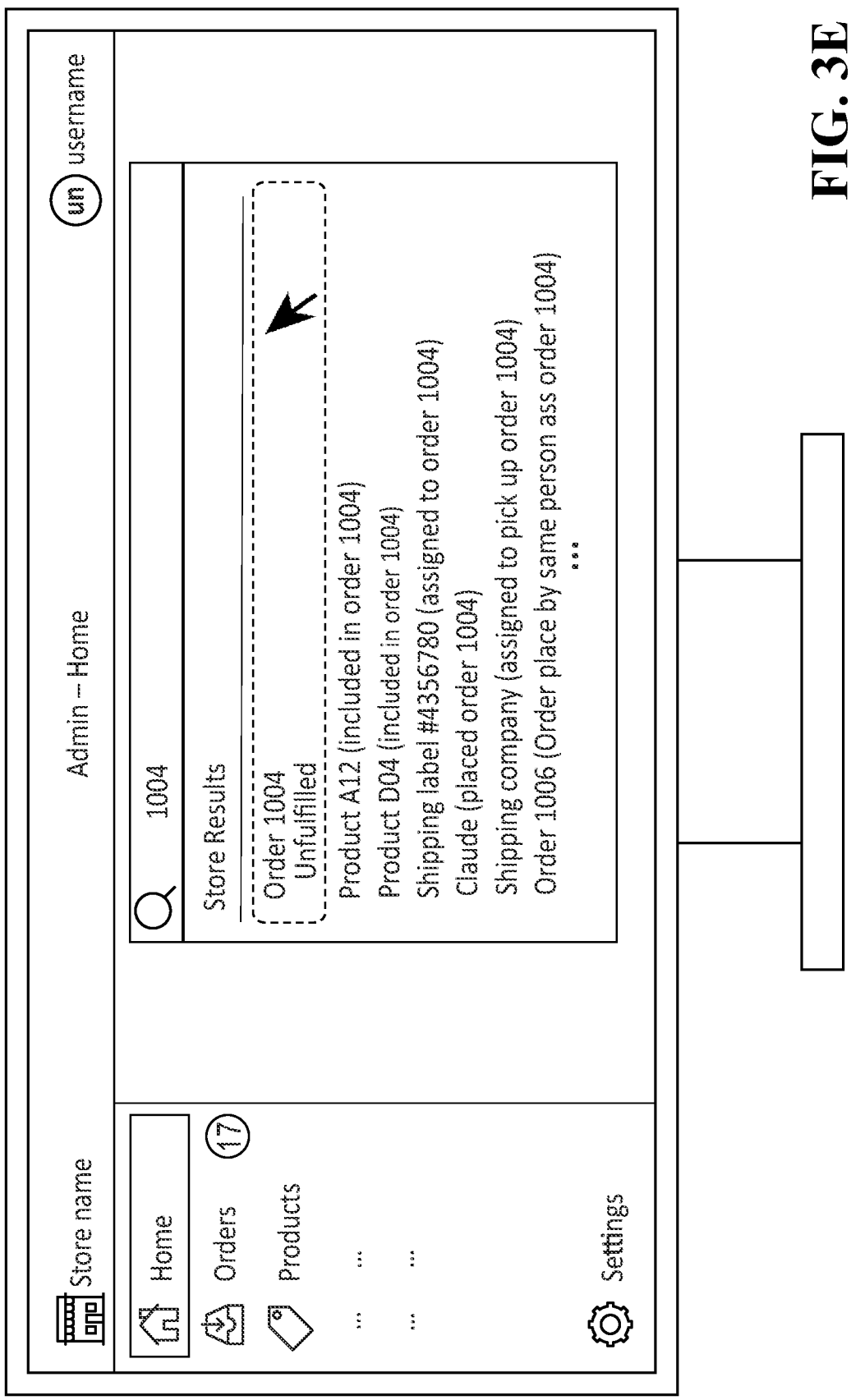

In FIG. 3E, the user has searched for 1004 in the general search query, various results are displayed; based on previous behaviour, "order 1004" is the first hit. Also based on previous behaviour maintained in the tracking information, the search result for "order 1004" displays the fulfilment status for the order, in this case "unfulfilled". The example of FIG. 3E presupposes that tracking information has been stored from which it can be deduced that a user entering a search query having a format "<##>" is interested in the fulfillment status of a commerce object order having order ID <##>. The search results depicted in FIG. 3D differ from those depicted in FIG. 3E, in that the fulfillment status is also depicted in FIG. 3E. The tracking information for the example of FIG. 3E differs from the tracking information for the example of FIG. 3D. The tracking information for the example of FIG. 3E shows, with a sufficient reliability based on whatever processing criteria are applied, that the user is interested in the fulfillment status, whereas the tracking information for the example of FIG. 3D does not show with a sufficient reliability that the user is interested in the fulfillment status, and as such, the additional information is not displayed. A similar analysis applies to the other examples below.

Figure 3F:
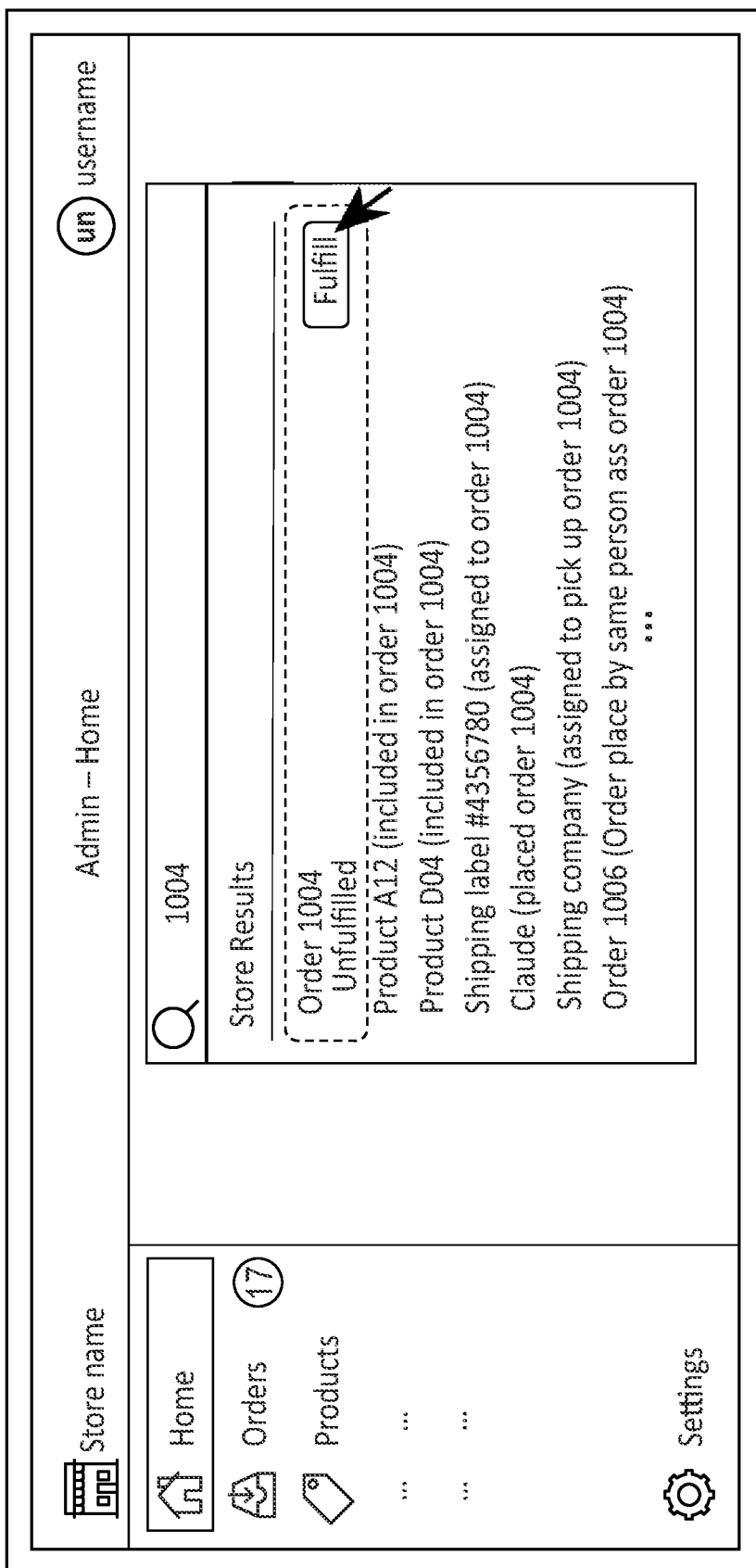

FIG. 3F shows an example that is the same as the example of FIG. 3E except for the addition of a shortcut to perform an action directly from the search result, in this case, a fulfil action. The example of FIG. 3F presupposes that tracking information has been stored from which it can be deduced that a user entering a search query having a format "<##>" is interested in the fulfillment status of an commerce object order having order ID <##>, and in performing a fulfil action for the order.

Figure 3G:
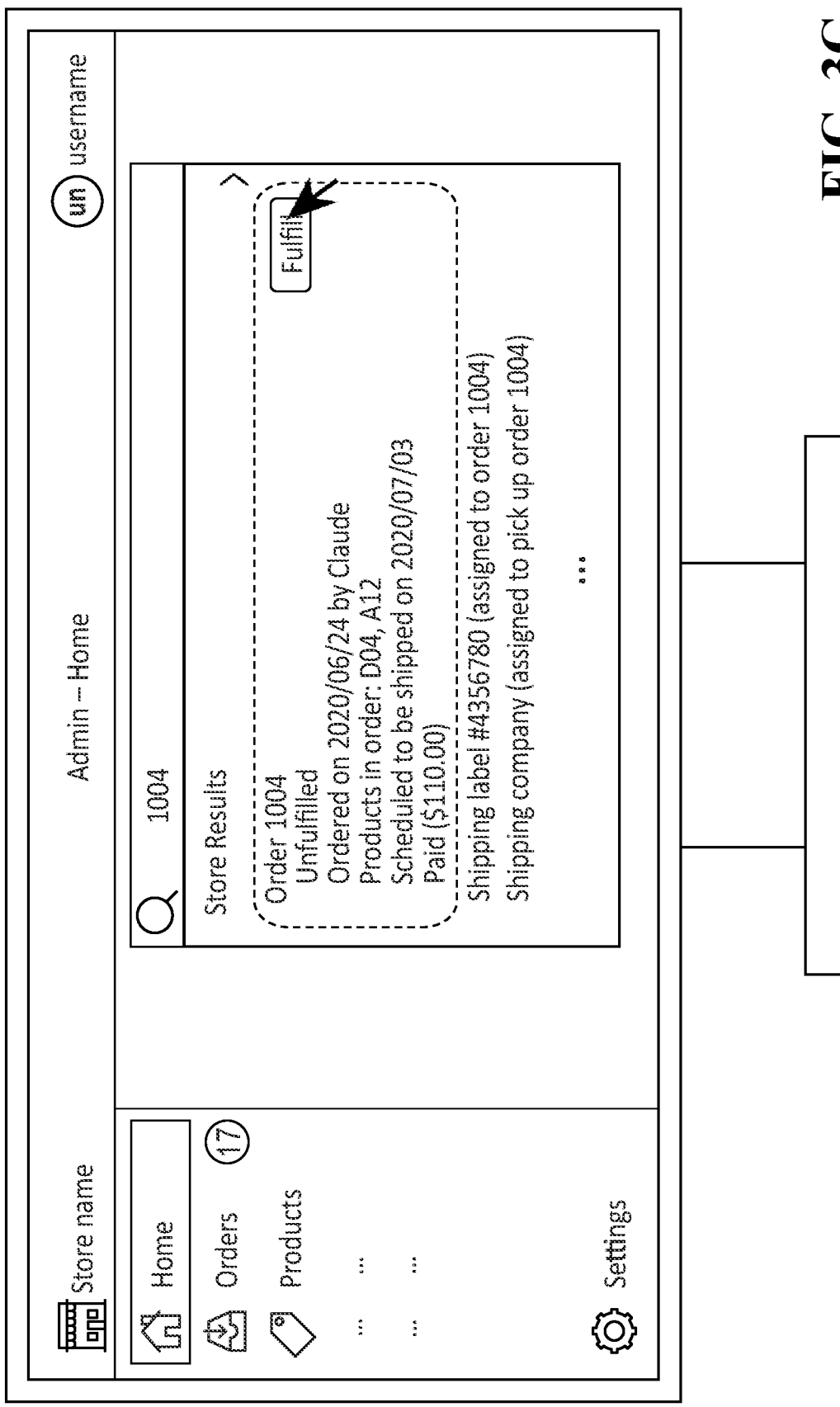

FIG. 3G shows an example that is the same as the example of FIG. 3F except for the inclusion of additional fields from the order also being displayed. The example of FIG. 3G presupposes that tracking information has been stored from which it can be deduced that a user entering a search query having a format "<##>" is interested in the fulfillment status of an commerce object order having order ID <##>, and in performing a fulfill action for the order, and that the user is also interested in the additional fields.

Figure 3H:
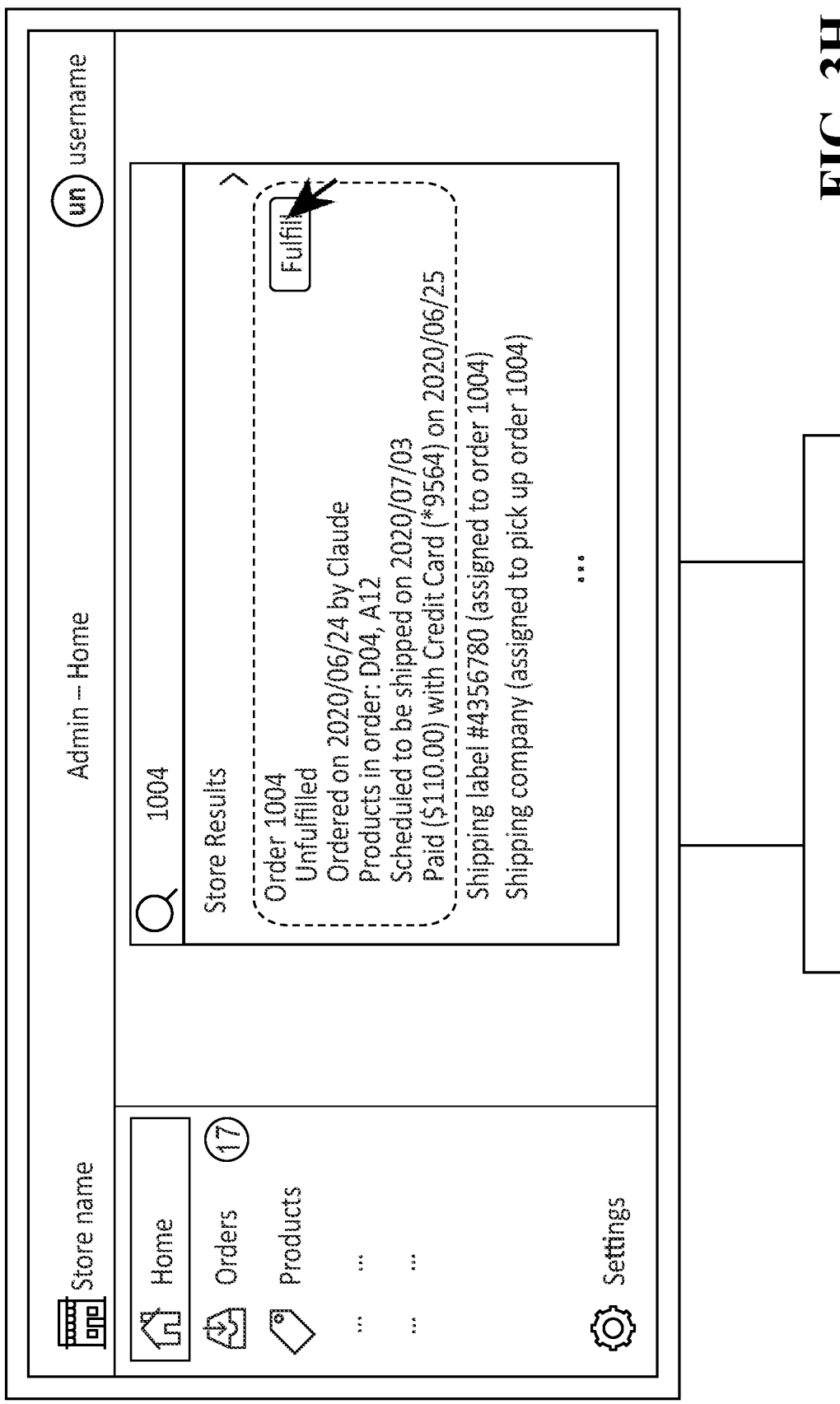

FIG. 3H shows an example that is the same as the example of FIG. 3G except for the inclusion of additional details of the payment. The example of FIG. 3H presupposes that tracking information has been stored from which it can be deduced that a user entering a search query having a format "order <##>" is interested in additional details of payment for order having order ID <##>.

Figure 3I:
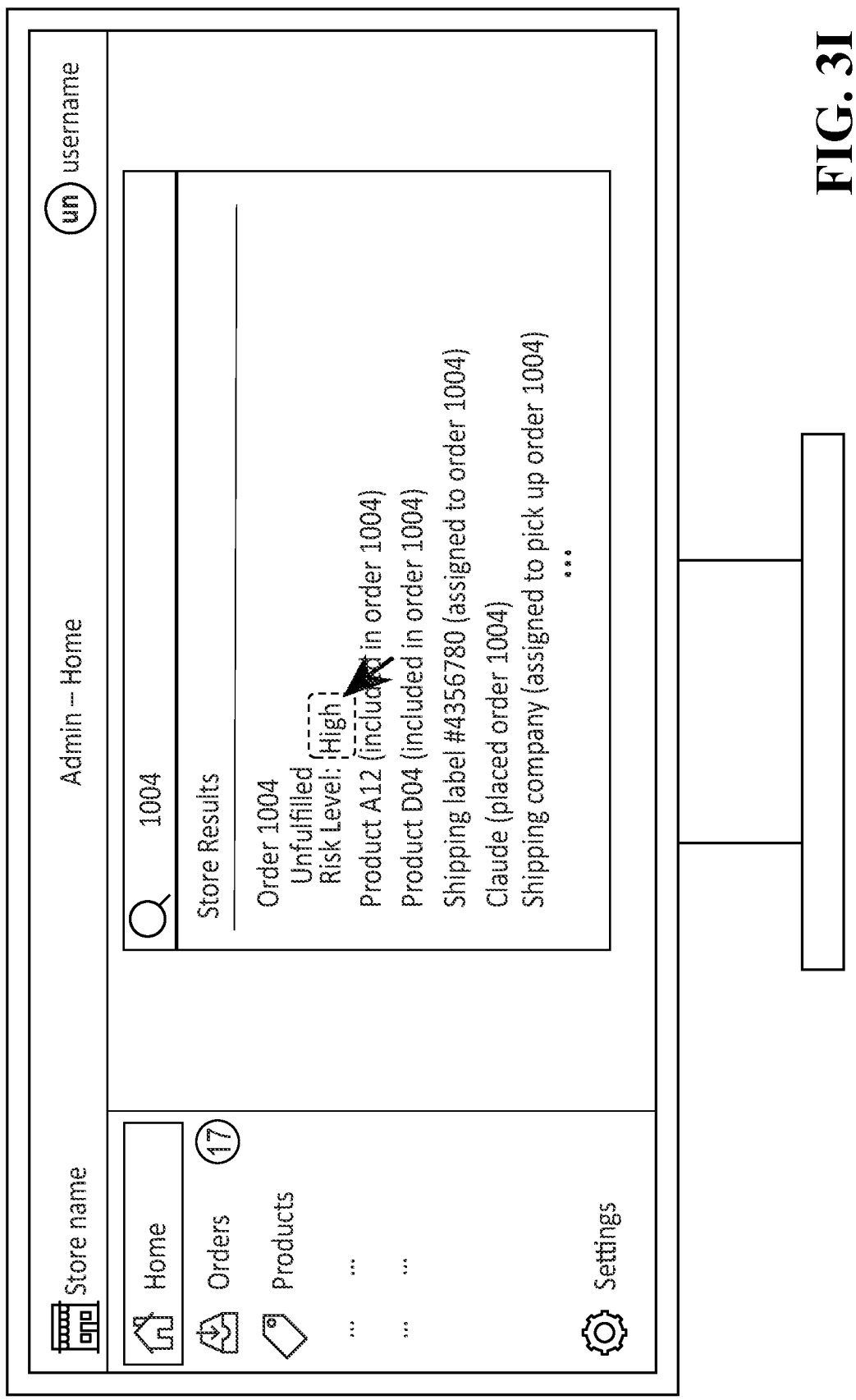

FIG. 3I shows an example that is the same as the example of FIG. 3E except for the inclusion of an additional editable field "Risk Level: High". The example of FIG. 3I presupposes that tracking information has been stored from which it can be deduced that a user entering a search query having a format "<##>" is interested in being able to edit the risk level for an order having order ID <##>.

A second set of examples will be described with reference to FIGS. 4A to 4C. This set of examples is assuming a customer service context, where a user is on the phone with a customer who has given their name and wants information about an order but they do not know the order number. The user enters the customer name into the general search.

Figure 4A:
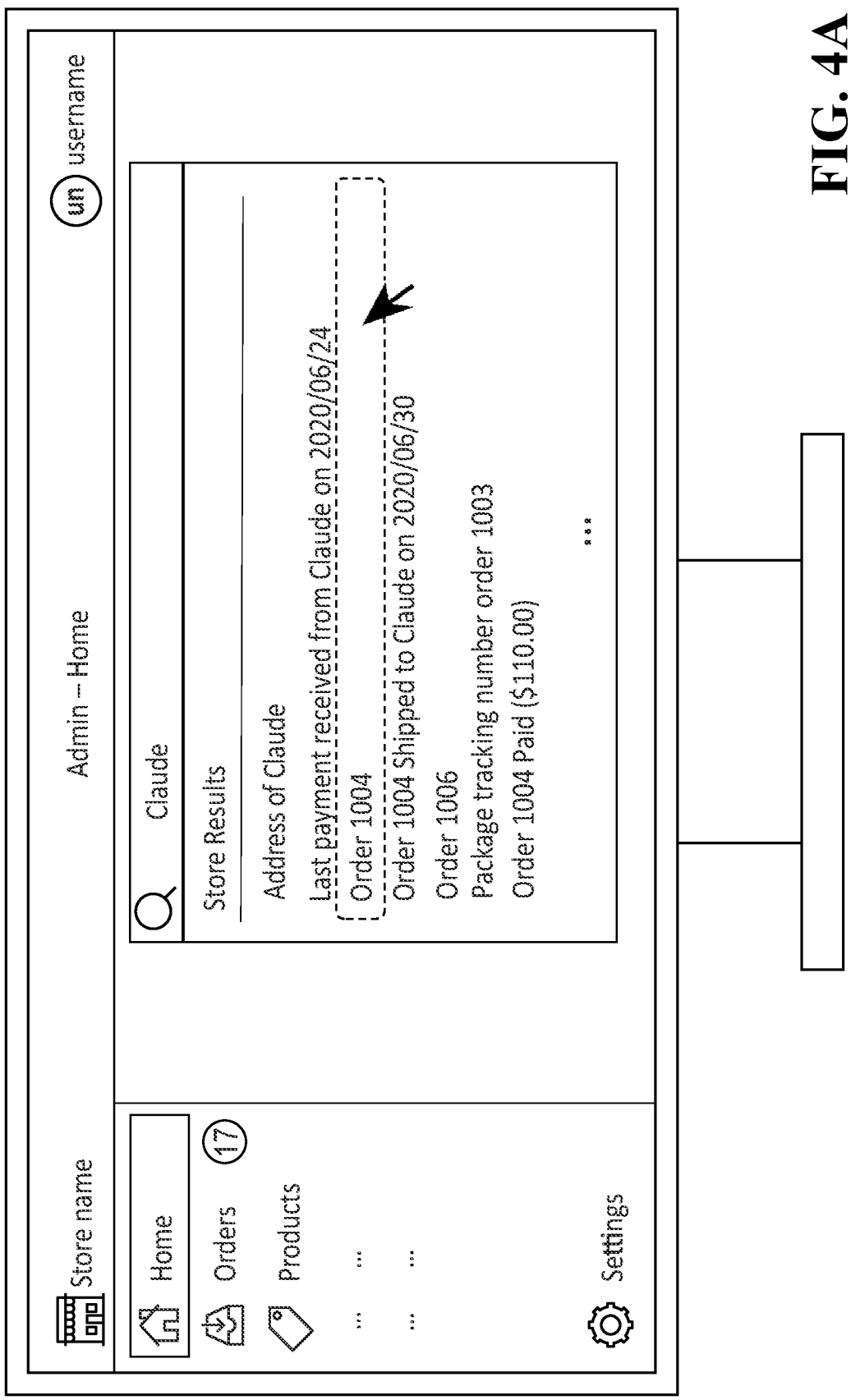
FIGS. 4A-4C are examples of graphical user interfaces for a second set of examples of presenting customized search results.

In the example of FIG. 4A, in response to the search, everything about the customer shows up (customer calling about status of order). This is done because the customer does not have a specific order number so the customer service rep must look through all orders associated with the name.

Figure 4B:
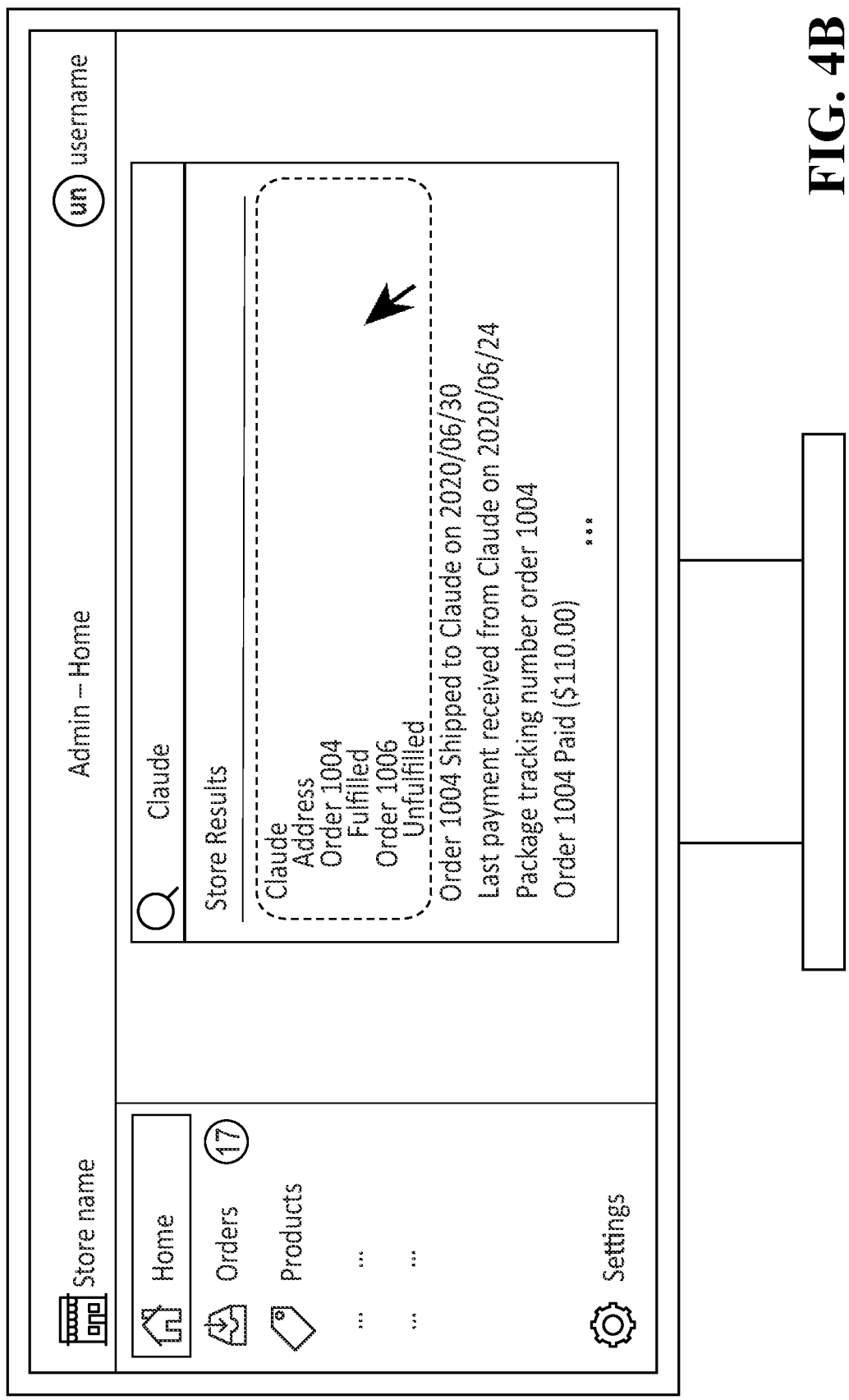

In the example of FIG. 4B, modified search results are presented compared to those in FIG. 4A, in which the top result includes the customer's orders and the fulfillment status. This helps the customer service representative quickly see customer orders to determine a pertinent one for the current call. The example of FIG. 4B presupposes that tracking information has been stored from which it can be deduced that a user entering a search query having a format "customer name" is interested in the customer's orders and fulfilment status for a customer having customer ID "customer name".

Figure 4C:
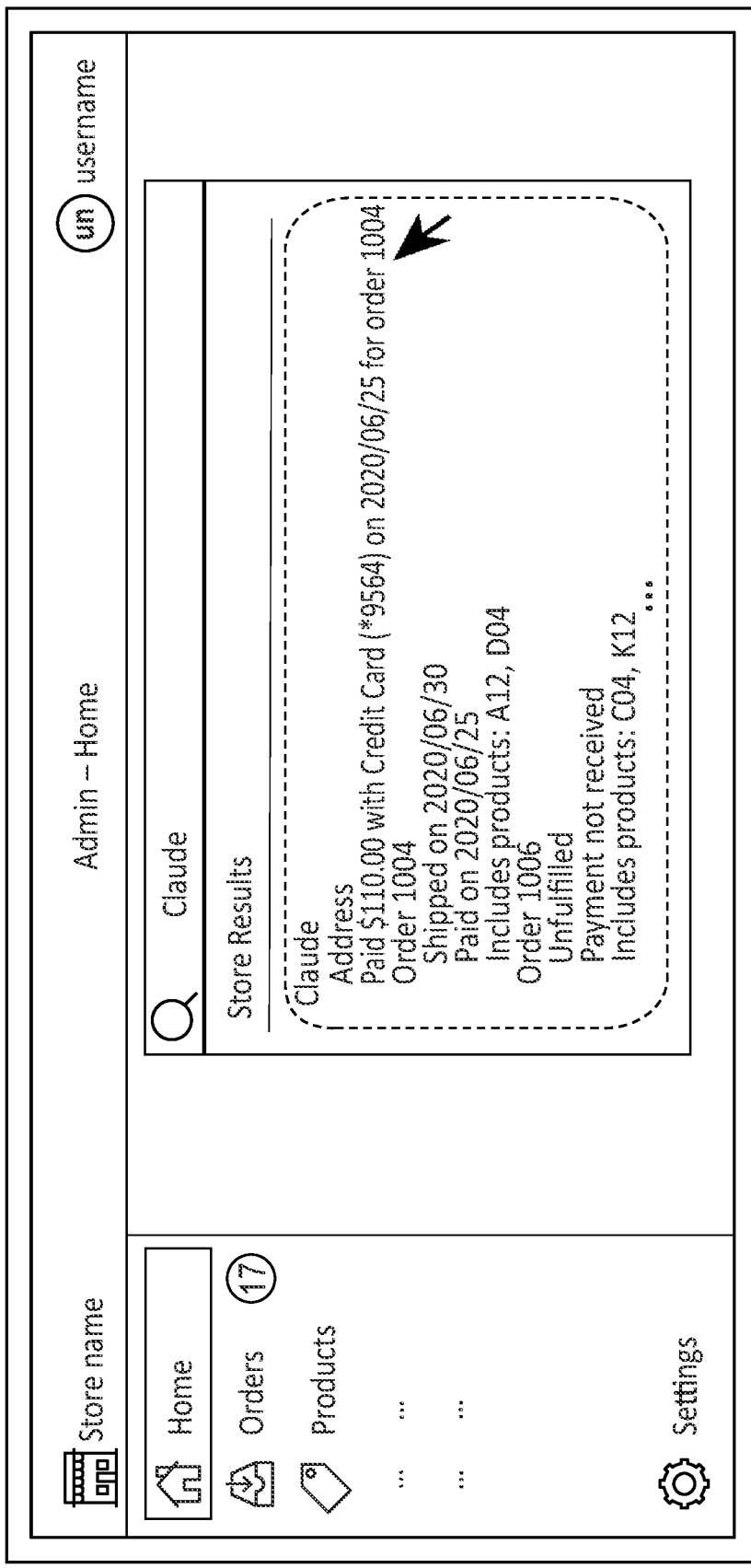

In the example of FIG. 4C, the top search result includes customer profile information and details of the customers orders. At this point, the customer service representative only needs to enter a customer name to obtain all pertinent information to handle the call. The example of FIG. 4C presupposes that tracking information has been stored from which it can be deduced that a user entering a search query having a format "customer name" is interested in the customer's orders and fulfilment status for a customer having customer ID "customer name", and is interested in customer profile information.

Configurations

In some embodiments, the system is configured with a number of different ways to display search results relating to a given type of object, for example a given type of commerce object. The specific configurations to develop may be based on an analysis of user behaviour, or expected user behaviour. For example, returning to the order number search example from above, for the search result for an order object, the following different search results may be configured:
1) basic result that includes the order #, who placed the order and when.
2) basic search result of 1) supplemented with fulfilment status.
3) search result of 2) supplemented with fulfilment status and shortcut to the filful task.
4) search result of 3) supplemented with further specific order fields.

Figure 5:
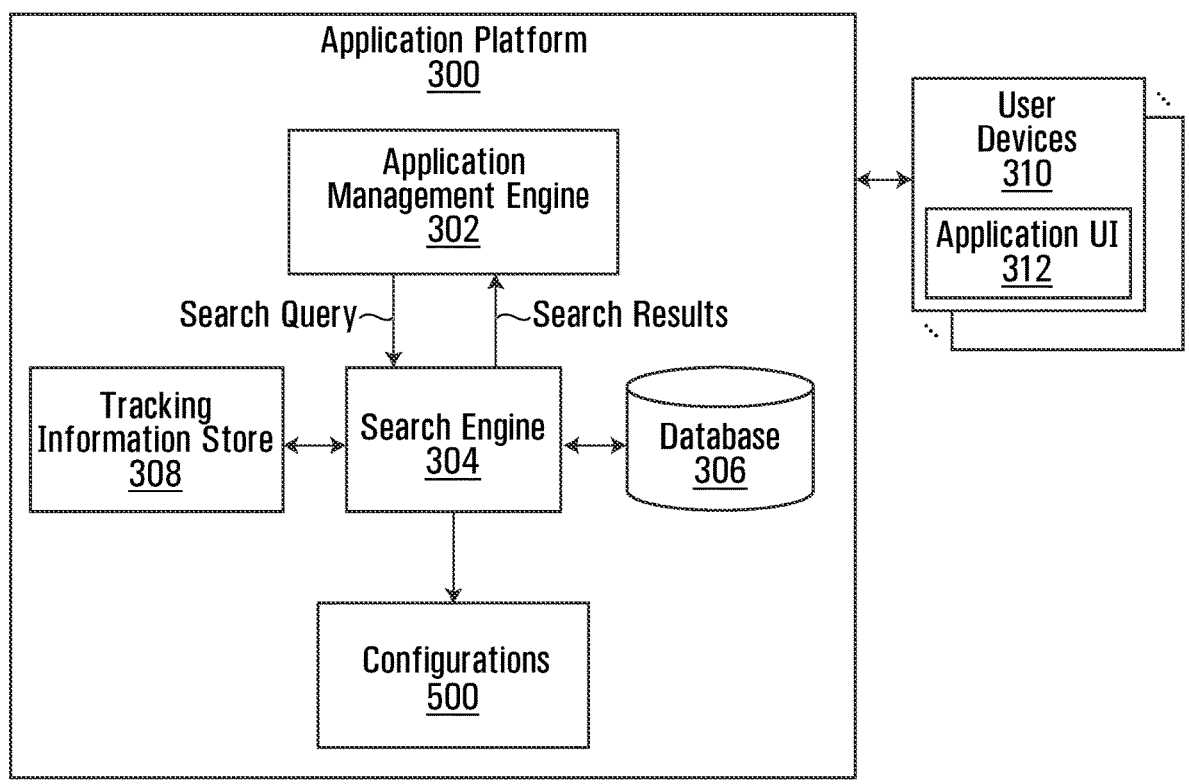
FIG. 5 is a block diagram of an application platform with customized search capability that takes into account tracking information pertaining to previous user behaviour, featuring configurations.

Then, based on prior user behaviour from the tracking information, one of the specific configurations is presented to the user for the search result pertaining to that commerce object. An example of a system including configurations is depicted in FIG. 5, which is the same as FIG. 1, except for the inclusion of configurations 500.

Search Result Framework(s)

In another embodiment, rather than relying on configurations, one or more search result frameworks are implemented in the system that can be flexibly configured based on user behaviour, or behaviour of the user and other users. An example of a search result framework is one that includes some combination of one or more of:
- One or more fields to clearly identify the search result (e.g. Order ID)
- One or more fields that can be dynamically assigned based on prior user behaviour. For example, if there were a single such field, this could be assigned to the fulfilment state of an order.
- One or more buttons/shortcuts which can be dynamically assigned specific functions. For example, a button could be dynamically assigned to the fulfil task described above.
- One or more fields of the commerce object for completion (if empty) or editing by the user directly from within the search result.

Figure 6:
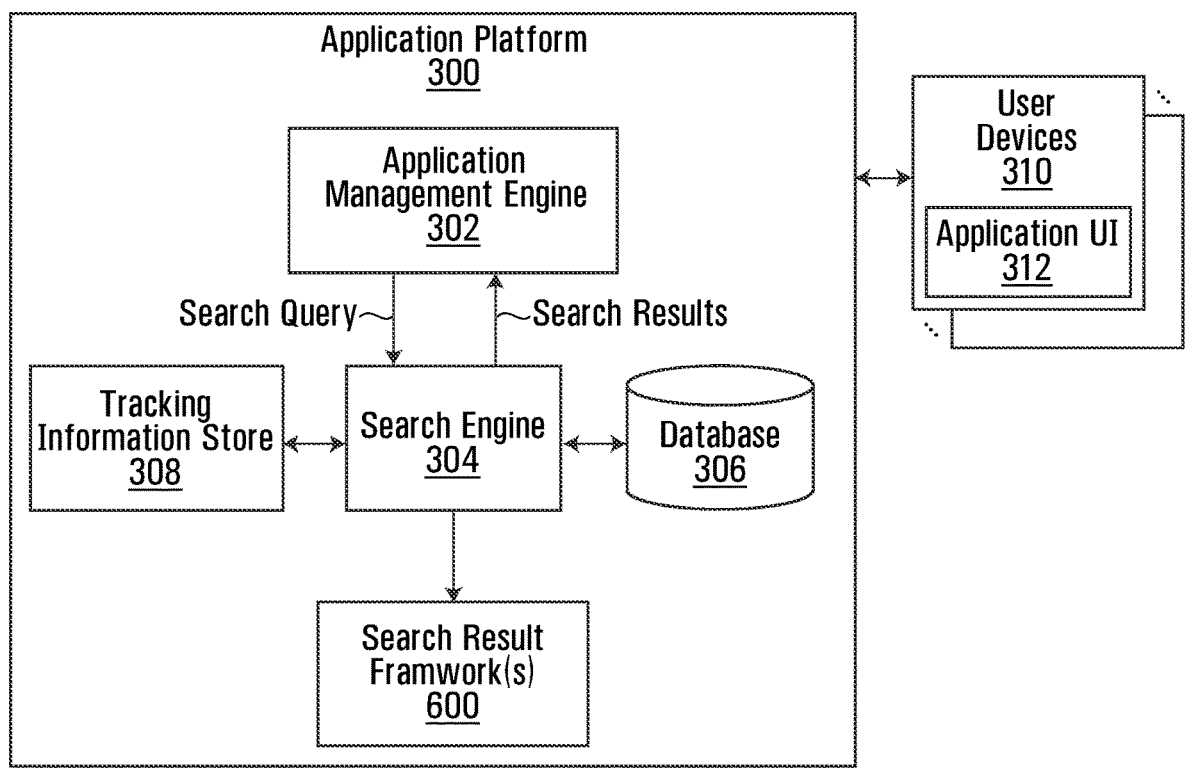
FIG. 6 is a block diagram of an application platform with customized search capability that takes into account tracking information pertaining to previous user behaviour, featuring search result frameworks.

An example of a system including search result framework(s) is depicted in FIG. 6, which is the same as FIG. 1, except for the inclusion of search result framework(s) 600.

The subject-matter of the present application may be employed in association with a variety of applications and in a variety of domains. As an example, the subject-matter of the present application may be employed for controlling and coordinating the execution of searches in e-commerce platforms. As such, while e-commerce is merely an example application domain for the subject-matter of the present application, an example e-commerce platform will now be described with reference to FIGS. 7 and 8.

Figure 7:
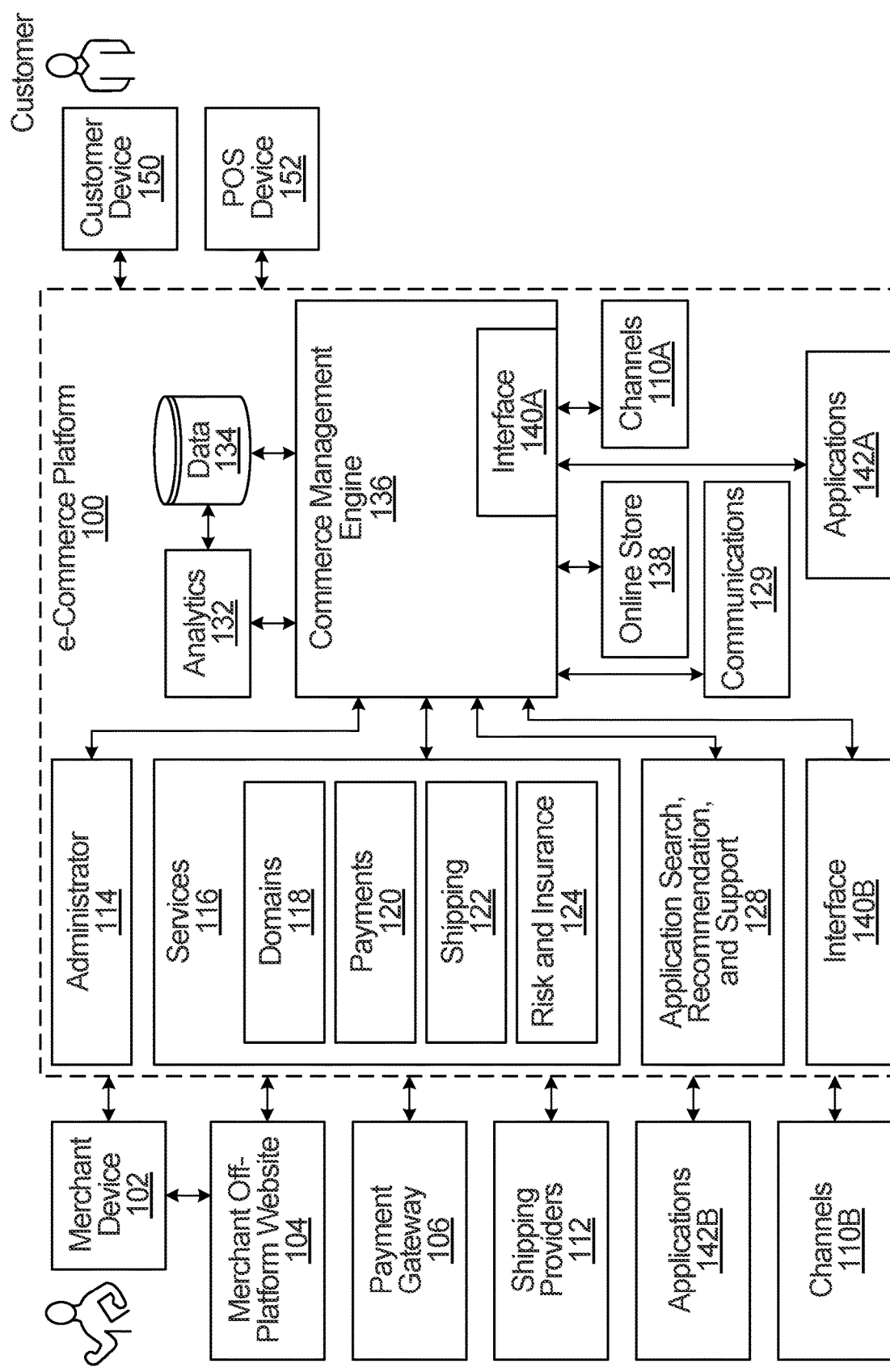
FIG. 7 is a block diagram of an e-commerce platform, according to one embodiment.

With reference to FIG. 7, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS device 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 8:
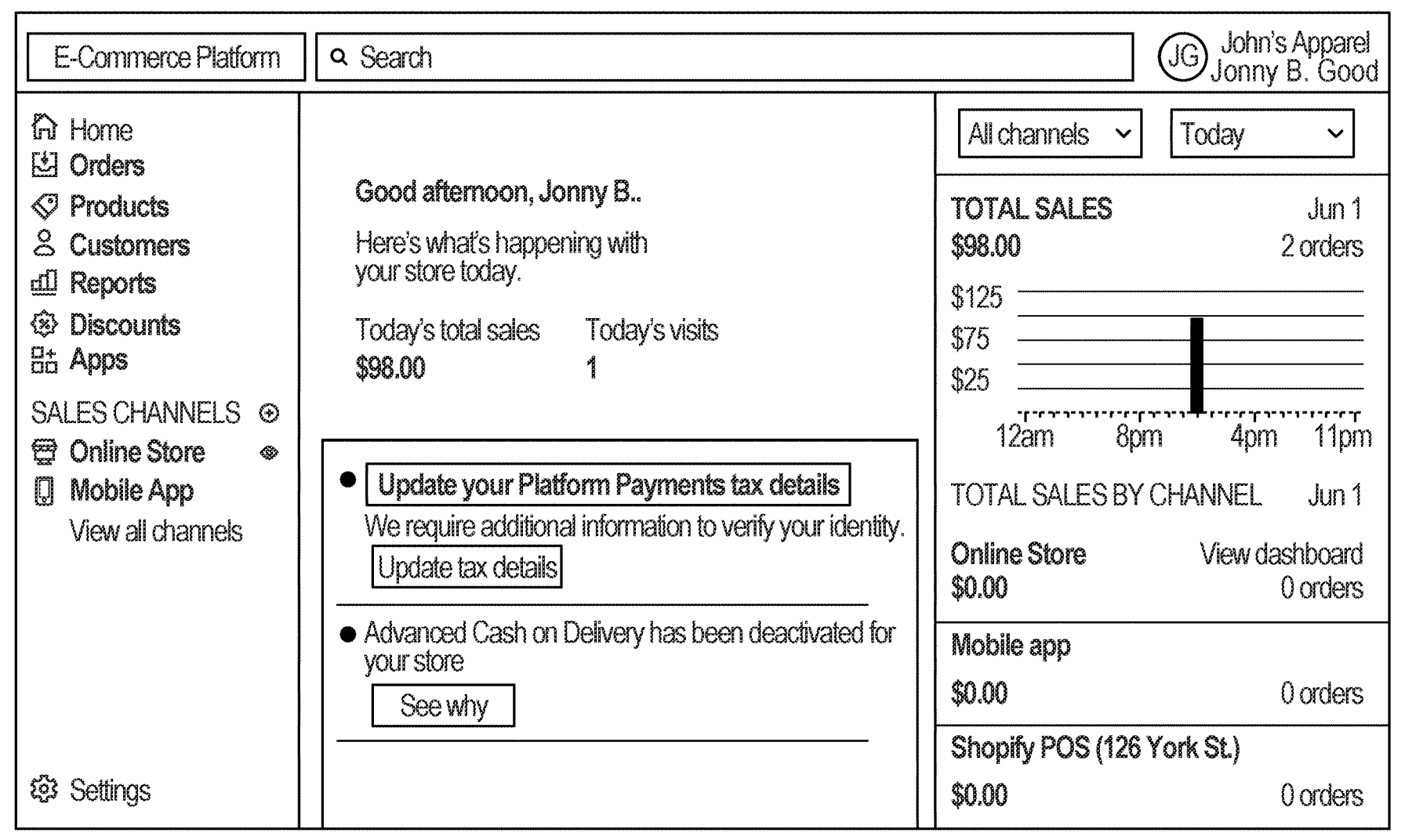

FIG. 8, which will be described with further reference to FIG. 1, depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 7 in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may make a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commerce management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

The e-commerce platform 100 may be providing sales channels for multiple merchants, for their respective customers, and for varying types of merchandise. Payment gateways 106 are provided by the e-commerce platform or by external parties to process transactions in an e-commerce environment.

As mentioned above, the subject-matter of the present application may be employed in relation to an e-commerce platform such as the e-commerce platform 100 of FIG. 7. Put another way, in addition to the above-noted e-commerce capabilities, the e-commerce platform of FIG. 7 can also be configured to generate customized search results in accordance with the subject-matter of the present application. Specifically, the tracking information store, and search engine described herein may be implemented within the commerce management engine 136 of the depicted e-commerce platform 100. However, it should be understood that the tracking information store and, more broadly, the subject matter of the present application, is not limited in its application to the e-commerce platform of FIG. 7, or to e-commerce platforms generally. More generally, the methods described herein can find application in a system where users perform searches repeatedly, and would benefit from the presentation of customized search results based on past user behaviour.

Numerous modifications and variations of the present disclosure are possible in light of the above teachings. It is therefore to be understood that within the scope of the appended claims, the disclosure may be practiced otherwise than as specifically described herein.

The invention claimed is:
1. A method comprising:
receiving a plurality of general search queries;
in response to each general search query:
  presenting a respective set of search results;
  receiving a request responsive to the respective set of search results, the request being one or a combination of two or more of:
    a) selection of a specific result from the respective set of search results,
    b) a further action on an object, or c) a further change to a data field accessed following selection of a specific search result from the respective set of search results;
  maintaining tracking information indicating what request was received for each general search query;
  receiving a further search query; and
in response to the further search query, presenting a further set of search results, wherein the further set of search results is presented in a manner taking into account the tracking information, and wherein in response to the further search query, presenting the further set of search results comprises:
  for at least one search result included in the further set of search results that relates to an object of a particular type, displaying a selected one of a plurality of configured search result display options for the particular type;
  for at least one search result included in the further set of search results that pertains to a commerce object, presenting one or more data fields of the commerce object for completion or editing by a user directly from within the search result, wherein the one or more data fields of the commerce object presented for completion or editing are determined taking into account the tracking information.

2. The method of claim 1, wherein in response to the further search query, presenting the further set of search results, comprises:
  for the at least one search result included in the further set of search results that relates to the object of the particular type, presenting a preview customized specific to the particular type based on the tracking information.

3. The method of claim 2 wherein presenting the preview customized based on the tracking information comprises one of:
  presenting a shortcut to a task;
  presenting one or more fields of the object for completion or editing by a user directly from within the search result.

4. The method of claim 1 wherein the at least one search result included in the further set of search results that relates to the object of the particular type relates to the at least one search result included in the further set of search results that pertains to the commerce object.

5. The method of claim 1 wherein in response to the further search query, presenting the further set of search results further comprises configuring a search result framework based on the tracking information that has:
  one or more fields to clearly identify the search result;
  one or more additional fields for viewing that can be dynamically assigned based on prior user behaviour;
  one or more shortcuts which can be dynamically assigned specific functions; and
  one or more fields of the commerce object for completion or editing by the user directly from within the search result.

6. The method of claim 1 further comprising:
  determining a type of the further search query;
  processing the stored tracking information pertaining to the type of further search query to determine how to present the further set of search results.

7. The method of claim 6 wherein processing the stored tracking information comprises processing stored tracking information for previous search queries by a same user who entered the further search query.

8. The method of claim 6 wherein processing the stored tracking information comprises processing stored tracking information for previous search queries by any user in a group of users satisfying a grouping criterion.

9. The method of claim 1 further comprising:
  maintaining the tracking information in association with a plurality of commerce object types that comprises at least product, order, return, and customer.

10. An apparatus comprising:
  a processor and a memory, the apparatus configured to execute a method comprising:
    receiving a plurality of general search queries;
    in response to each general search query:
      presenting a respective set of search results;
      receiving a request responsive to the respective set of search results, the request being one or a combination of two or more of:
        a) selection of a specific result from the respective set of search results,
        b) a further action on an object of a particular type, or
        c) a further change to a data field accessed following selection of a specific search result from the respective set of search results;
      maintaining tracking information indicating what request was received for each general search query;
    receiving a further search query; and
  in response to the further search query, presenting a further set of search results, wherein the further set of search results is presented in a manner taking into account the tracking information, and wherein in response to the further search query, presenting the further set of search results comprises:
    for at least one search result included in the further set of search results that relates to an object of a particular type, displaying a selected one of a plurality of configured search result display options for the particular type;
    for at least one search result included in the further set of search results that pertains to a commerce object, presenting one or more data fields of the commerce object for completion or editing by a user directly from within the search result, wherein the one or more data fields of the commerce object presented for completion or editing are determined taking into account the tracking information.

11. The apparatus of claim 10, wherein the apparatus is configured to, in response to the further search query, present the further set of search results, by:
  for the at least one search result included in the further set of search results that relates to the object of the particular type, presenting a preview customized specific to the particular type based on the tracking information.

12. The apparatus of claim 11 wherein the apparatus is configured to present the preview customized based on the tracking information by one of:
  presenting a shortcut to a task;
  presenting one or more fields of the object for completion or editing by a user directly from within the search result.

13. The apparatus of claim 10 wherein the at least one search result included in the further set of search results that relates to the object of a particular type relates to the at least one search result included in the further set of search results that pertains to the commerce object.

14. The apparatus of claim 10 wherein the apparatus is configured to, in response to the further search query, present the further set of search results further by configuring a search result framework based on the tracking information that has:
  one or more fields to clearly identify the search result;
  one or more additional fields for viewing that can be dynamically assigned based on prior user behaviour;
  one or more shortcuts which can be dynamically assigned specific functions; and
  one or more fields of the commerce object for completion or editing by the user directly from within the search result.

15. The apparatus of claim 10, wherein the apparatus is further configured to:
  determine a type of the further search query;
  process the stored tracking information pertaining to the type of further search query to determine how to present the further set of search results.

16. The apparatus of claim 15 wherein the apparatus is configured to process the stored tracking information by processing stored tracking information for previous search queries by a same user who entered the further search query.

17. The apparatus of claim 15 wherein the apparatus is configured to process the stored tracking information by processing stored tracking information for previous search queries by any user in a group of users satisfying a grouping criterion.

18. The apparatus of claim 10 wherein the apparatus is further configured to:
  maintain the tracking information in association with a plurality of commerce object types that comprises at least product, order, return, and customer.

19. A non-transitory computer-readable medium having instructions stored thereon that, when executed by a computer, cause the computer to perform a method comprising:
  receiving a plurality of general search queries;
  in response to each general search query:
    presenting a respective set of search results;
    receiving a request responsive to the respective set of search results, the request being one or a combination of two or more of:
      a) selection of a specific result from the respective set of search results,
      b) a further action on an object of a particular type, or
      c) a further change to a data field accessed following selection of a specific search result from the respective set of search results;
    maintaining tracking information indicating what request was received for each general search query;
  receiving a further search query; and
  In response to the further search query, presenting a further set of search results, wherein the further set of search results is presented in a manner taking into account the tracking information, and wherein in response to the further search query, presenting the further set of search results comprises:
for at least one search result included in the further set of search results that relates to an object of a particular type, displaying a selected one of a plurality of configured search result display options for the particular type;
for at least one search result included in the further set of search results that pertains to a commerce object, presenting one or more data fields of the commerce object for completion or editing by a user directly from within the search result, wherein the one or more data fields of the commerce object presented for completion or editing are determined taking into account the tracking information.

\* \* \* \* \*